United States Patent
Othmer et al.

(10) Patent No.: US 6,266,788 B1
(45) Date of Patent: Jul. 24, 2001

(54) SYSTEM AND METHOD FOR AUTOMATICALLY CATEGORIZING AND CHARACTERIZING DATA DERIVED FROM A COMPUTER-BASED SYSTEM

(75) Inventors: Konstantin Othmer, Mountain View; Chris Derossi, San Jose, both of CA (US)

(73) Assignee: Support.com, Inc., Redwood City, CA (US)

( * ) Notice: Subject to any disclaimer, the term of this patent is extended or adjusted under 35 U.S.C. 154(b) by 0 days.

(21) Appl. No.: 09/108,273

(22) Filed: Jul. 1, 1998

(51) Int. Cl.[7] ............................................ G06F 11/08

(52) U.S. Cl. ........................ 714/38; 707/202; 395/704; 395/712

(58) Field of Search ................................ 395/704, 712; 714/38; 707/202

(56) References Cited

U.S. PATENT DOCUMENTS

| | | | |
|---|---|---|---|
| 5,513,315 | * | 4/1996 | Tierney et al. .......................... 714/37 |
| 5,598,333 | * | 1/1997 | Marisco, Jr. ............................ 714/38 |
| 5,754,760 | * | 5/1998 | Warfield ................................. 714/38 |
| 5,758,062 | * | 5/1998 | McMahon et al. ..................... 714/38 |
| 5,911,041 | * | 6/1999 | Schaffer ................................ 395/704 |
| 6,002,869 | * | 12/1999 | Hinckley ............................... 395/704 |

* cited by examiner

Primary Examiner—Jean R. Homere
(74) Attorney, Agent, or Firm—Fish & Richardson P.C.

(57) ABSTRACT

A system and method for automatically categorizing and characterizing data from a computer-based system is provided in which the data is classified based on information within the data in order to permit a user of the system to easily group similar incidents within software code based on various criteria and the contents of the data in the incident report. The system may also automatically attempt to recreate any incident indicated by the data. The system may also permit the user of the system to debug a software application whereby parameters that characterize an incident are correlated.

26 Claims, 3 Drawing Sheets

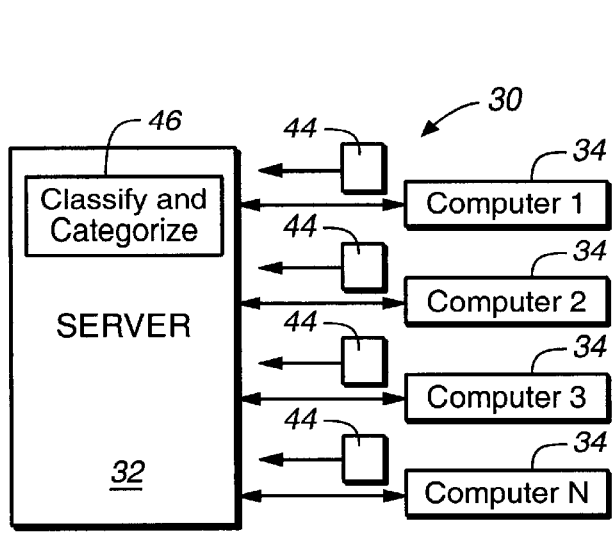
FIG._1
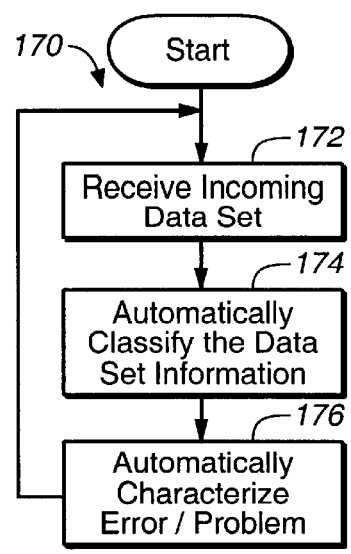
FIG._2
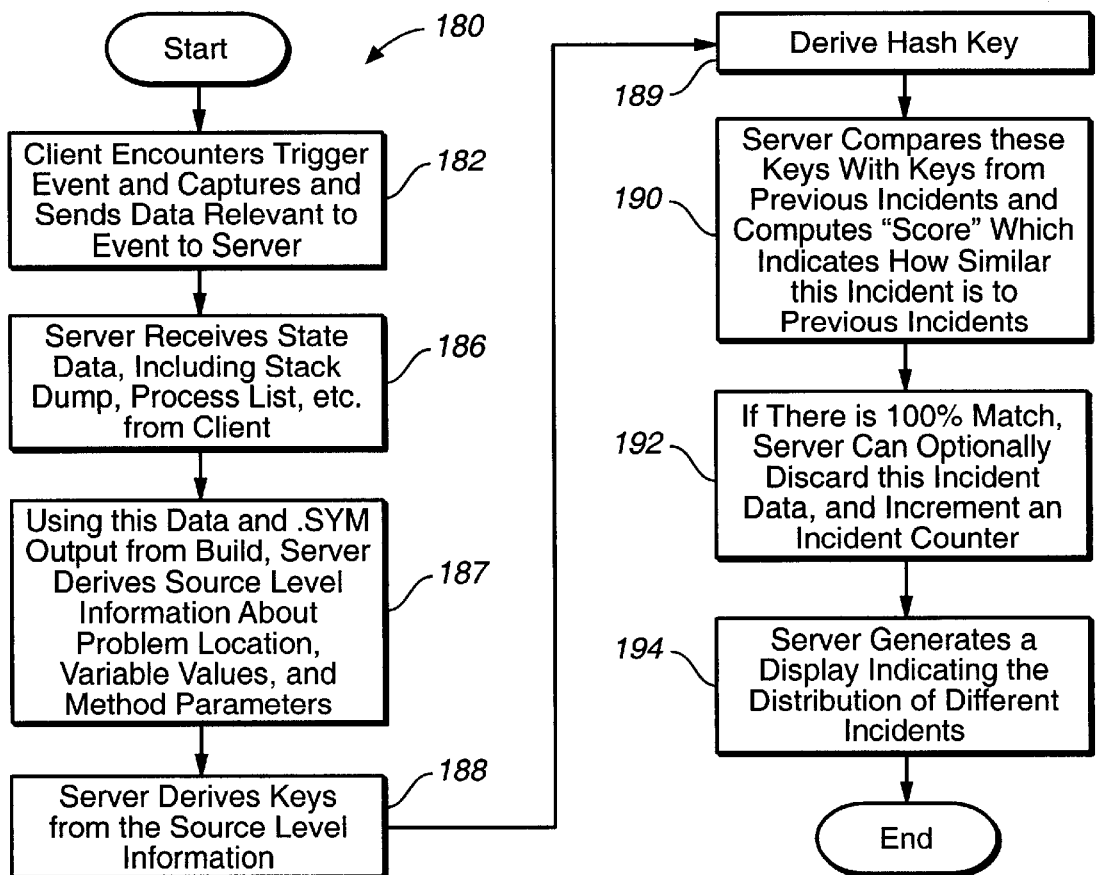
FIG._3

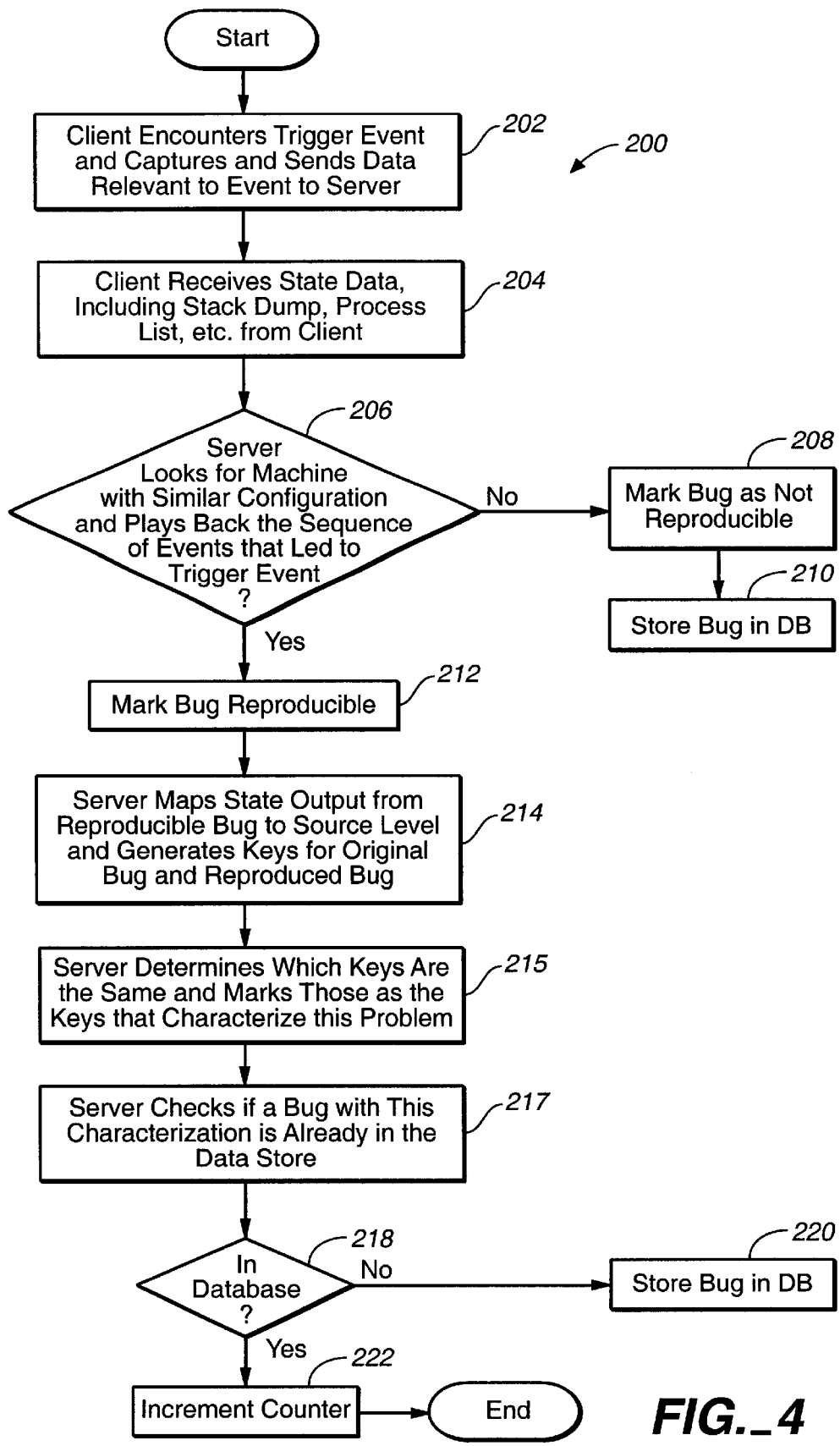
FIG._4

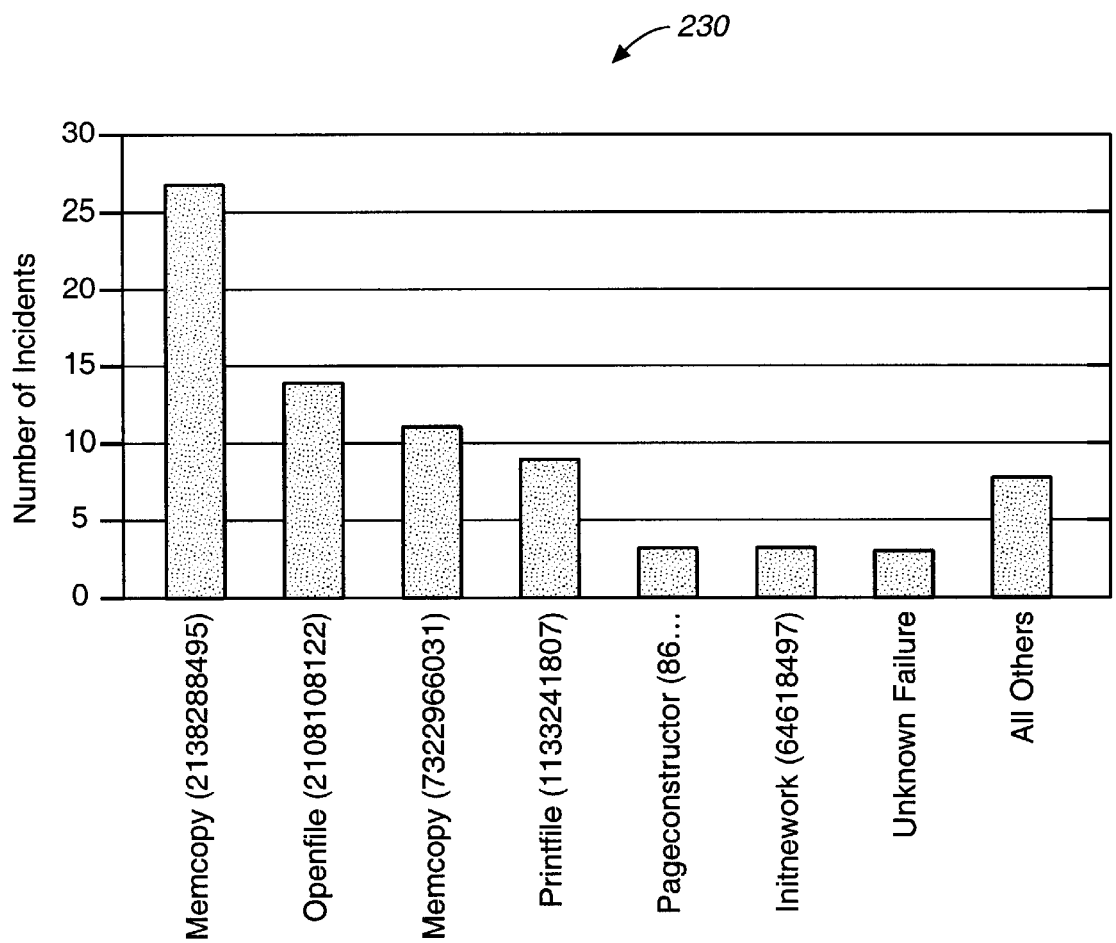
FIG._5

SYSTEM AND METHOD FOR AUTOMATICALLY CATEGORIZING AND CHARACTERIZING DATA DERIVED FROM A COMPUTER-BASED SYSTEM

BACKGROUND OF THE INVENTION

This invention relates generally to a system and method for processing one or more data sets received from one or more computer-based systems and in particular to a system and method for automatically categorizing and characterizing the data sets generated by the computer-based system.

The tremendous expansion of the Internet has led to the expansion of the number features in software applications. The expansion of the Internet has also necessitated the more rapid development of various software applications and has changed various software development methodologies. For example, the technique for beta testing software applications has drastically changed. Prior to the proliferation of the Internet, a company might beta test a software application by distributing the software application by floppy disk to a limited number of beta testers. With the Internet, the process of beta testing requires only that the developer place the beta software application on its web site and then anyone interested in beta testing the software application may do so with almost no expense to the developer. The problem with both of these beta test distribution techniques, however, is that it is difficult for the developer of the software to obtain good feedback from the beta testers.

Therefore, in order to properly beta test a software application and for the developer to benefit from the beta test, it is desirable to provide some medium for the beta testers to communicate with the developer who can gather the beta testers' bug reports and comments and correct any bugs. This process was typically accomplished by a beta test coordinator who was responsible for gathering the relevant information and routing the bug reports to the appropriate engineers. It is desirable to provide a system that automatically retrieves the bug reports and comments from beta testers.

In order to provide quality assurance (QA) feedback to a user of the software application, it is additionally desirable to be able to recreate a user's problem so that the Quality Assurance person can quickly help the user. In some conventional systems, the Quality Assurance person attempts to recreate the problem based on a user's recollections of the events, the user actions within the software application, such as entering the print routine, or the keystrokes that caused the error. This is very often difficult to accomplish since either the user may not remember all of the steps he took that caused the problem or the problem only manifests itself on the user's computer due to the configuration of the user's computer. In addition, determining the exact configuration of the user's computer is sometimes difficult since the user may not remember, for example, the type of graphics card that he installed in his computer. Therefore, it is desirable to be able to determine the configuration of a user's computer and capture information about the user's actions in order to help the Quality Assurance process.

Once a plurality of pieces of data about a machine state in a computer-based system, known as a data set, have been received from a computer-based system, it is desirable to be able to automatically process these pieces of data. In particular, it is desirable to group the data into categories of similar incidents. To categorize each piece of data, it is necessary to parse the pieces of data and automatically generate links between pieces of data that contain information about, for example, the same software crash. Duplicate pieces of data about the same event may be automatically identified and removed. It is also desirable to determine whether a particular incident is a first instance of a particular problem. A conventional bug tracking system often makes it difficult to eliminate pieces of data about the same bug or event since a person must search through all existing bug reports in order to determine the particular problem has already been located. To automatically recreate a crash, known as characterization, the system must determine the crash parameters from the piece of data and recreate the problem, if possible.

No known system automatically classifies and characterizes a data set containing information about the state of a computer-based machine. Thus, there is a need for a system and method for automatically classifying and categorizing state machine data and it is to this end that the present invention is directed.

SUMMARY OF THE INVENTION

The invention provides a system and method for automatically classifying a data set, containing pieces of data representing a state of a computer-based system, which have been generated in a variety of manners. For example, the data set may be generated by remotely monitoring a plurality of computer-based systems for the purpose of beta testing a new piece of software or by receiving a data set from a single personal computer system. In one embodiment of the invention, the information in each data set is analyzed to determine if a particular piece of data relates to a previously reported software or hardware bug, to classify the piece of data accordingly and to take some action based on the classification. For example, for duplicate pieces of data about the same bug, a counter may be incremented instead of storing the duplicate piece of data. In another example, the system may receive a data set from a variety of different computer platforms and then classify these data sets from different computer platforms.

The invention provides a system and method for automatically classifying a data set received from a computer-based system. In particular, the information in a data set which corresponds to an incident, such as a software or hardware crash, may be classified by any combination of the information in the data set. Thus, each incident may be classified based on different information in the data set. For example, the information in each piece of data is analyzed to determine if a particular piece of data relates to a previously reported software or hardware bug and classify the piece of data accordingly. If the piece of data relates to a new problem, the system may notify another system, such as a bug tracking system, or may send a message directly to the engineer responsible for the code. If the piece of data is determined to be a duplicate, duplicate pieces of data about the same bug may be eliminated, an incident counter for the particular bug may be incremented, and no additional notification is necessary.

In accordance with another aspect of the invention, the automatic classification system may perform multiple analyses for a particular data set in order to 1) automatically select the analysis which is most effective (i.e., fits most closely with the information in the data set); and/or 2) combine the multiple analyses results to generate a classification confidence level.

The invention also provides a system for automatically characterizing each bug/error identified by the automatic classification system. In particular, the system automatically attempts to reproduce an identified bug/error based on any of the information in the data set. The system may use the information in the data set to generate a template for emulating the entire environment and situation in which the incident occurred. For example, the categorization system may attempt to reproduce an error using the same size hard disk drive as the system which crashed or may use the same hardware drivers. In addition, the automatic categorization system may attempt to reproduce an error using various permutations of the crashing system's configuration to determine which factors caused the error.

In accordance with the invention, a system and method for processing data retrieved from a computer-based system is provided in which each piece of data indicates the state of each computer-based system when a predetermined event occurs within the computer-based system. In accordance with the invention, the event state data in an incident report from the computer-based system is received, and the event state data is analyzed, such as by a hashing process, to derive information about the location in a software code which caused the predetermined event to generate an incident report. The generated incident report may be compared to other previously generated incident reports to classify the incident report, based on the data contained in the incident report. By classifying incident reports in this manner, the invention provides a system and method for debugging a plurality of remote computer-based systems using a variety of correlative techniques.

In accordance with the invention, a system and method for processing a data set retrieved from a computer-based system is provided in which each data set indicates the state of the computer-based system when a predetermined incident occurs within the computer-based system. In accordance with the invention, the incident state data is received from the computer-based system and the incident state data is processed to derive one or more keys that characterizes the incident.

In accordance with another aspect of the invention, a system and method for categorizing data derived from a computer-based system is provided in which characteristics which uniquely identify an incident report associated with a particular predetermined incident are identified, the predetermined incident is automatically simulated using the identified characteristics, and an incident report is identified as reproducible if the predetermined event is reproduced.

BRIEF DESCRIPTION OF THE DRAWINGS

FIG. 1 is a block diagram illustrating an example of a system that may include an automatic classification and categorization system in accordance with the invention;

FIG. 2 is a flowchart illustrating a method for processing data in accordance with the invention;

FIG. 3 is a flowchart illustrating more details of a method for automatic classifying in accordance with the invention;

FIG. 4 is a flowchart illustrating more details of a method for automatically characterizing in accordance with the invention; and FIG. 5 is a chart illustrating an example of incident report used for the characterization system in accordance with the invention.

DETAILED DESCRIPTION OF A PREFERRED EMBODIMENT

The invention is particularly applicable to a system and method for automatically classifying and categorizing a data set containing information about an incident, such as a software or hardware crash, which occurred in a computer-based system and it is in this context that the invention will be described. It will be appreciated, however, that the system and method in accordance with the invention has greater utility. For example, the system may be used to classify and categorize other types of information in a data set and may also be used with other types of computer-based systems, such as vending machines, scales, money changers, ticket dispensers, automatic teller machines (ATMs), blood glucose monitors, arcade video games, medical laboratory equipment, video tape players, private branch exchanges (PBXs), automobiles or stereo receivers, in order to determine if the machine is, for example, suffering a malfunction or to determine how much money has been collected by the machine. Prior to describing the invention, an example of a system that may include the invention will be described.

FIG. 1 is a block diagram of a system 30 for monitoring a plurality of computer based systems 34 that may include an automatic classification and categorization system 46 in accordance with the invention. Although in this example, a server 32 may monitor a plurality of computer-based systems 34 to receive a plurality of data sets 44, the automatic classification and categorization system and method in accordance with the invention may also receive the data set from a single computer-based system or any other source. In this example, an incident, such as a software or hardware crash or error, may occur in one of the computer-based systems 34 and a data set 44 may be generated by that computer-based system. The data set may contain various information about the state of the computer-based system immediately after the incident. The data set 44 may be communicated to the server 32. The server 32 may include the automatic classification and categorization system 46 which processes the data set in accordance with the invention. The automatic classification and categorization system 46 may be a software application being executed by a microprocessor (not shown) of the server 32. Unlike the example shown in FIG. 1, the automatic classification and categorization system may also be a software application being executed by a microprocessor (not shown) of the computer-based system 34 or any other microprocessor. Thus, the invention is not limited to any particular source of the data set being processed or to the physical location of the automatic classification and categorization system.

Another example of a system which may include an automatic classification and categorization system in accordance with the invention is disclosed in US application Ser. No. 08/994,840 filed on Dec. 19, 1997, which is owned by the same assignee as the present application and which is incorporated herein by reference. Thus, it will be appreciated that the invention may be incorporated into a variety of different systems which generate the data set in a variety of different manners. The details of the automatic classification and categorization system 46 and method in accordance with the invention will now be described.

FIG. 2 is a flowchart illustrating a method 170 for processing a data set in accordance with the invention. For purposes of this description of the method, reference is made to the system shown in FIG. 1, but the method is not limited to any particular system which generates the data set. In step 172, the server 32 may receive the incoming data set information. Next in step 174, the server may automatically classify the particular data set based upon the information contained within the data set. The data set may contain information about the state of the computer-based system at a particular time or when a particular incident occurs, such as when a software application being executed by the computer-based system crashes. The data set may also contain the events (e.g., a history of the events, such as user actions) that occurred on the monitored computer-based system prior to the incident. The automatic classification system may classify each data set based on any combination of information in the data set which indicates a particular incident occurred. For example, a hardware failure in the computer-based system may be classified by the set of voltage level values on certain pins of an integrated circuit which may be stored in the data set received from the computer-based system. As another example, for a software crash incident, the information used to classify the data set may be quite varied depending on the type of the software crash. For example, to classify a software deadlock situation, a total up time value, a recent load value and a number of unique network connections may be used. As another example, in the event of an error condition (i.e., operator error), the classification of the data set may be completed by comparing the event history, contained in the data set associated with the error condition, that led up to the error with the event histories of other data sets already stored in the database. In addition, the automatic classification system may perform multiple different classification analyses for each data set in order to 1) determine which classification analysis is most effective for each data set (i.e., which classification analysis best fits the information in the data set); and/or 2) combine the results from the multiple classification analyses to produce a classification confidence level for a particular data set.

The automatic classification system and method may perform a variety of operations based on the classification analyses. For example, the server may attempt to identify an incoming data set which is similar or identical to another data set so that a duplicate data set may be removed from the database. It is desirable to remove these duplicate entries since otherwise it requires the manual search through all of the existing reports in order to determine if a particular problem has previously been identified. The automatic classification method in accordance with the invention will be described below in more detail with reference to FIG. 3.

In step 176, the server may automatically characterize each error/problem which is located or sent to the server. In particular, the server will attempt to characterize each of these bugs or problems based on the values in the data set data and then attempt to reproduce that same error to determine if the error is in fact reproducible. As a simple example, in the case of a Netscape Navigator™, a crash is often uniform resource locator (URL) dependent. Thus, when a bug comes in, the system may take application specific data, such as the last user's actions and what URL the application was displaying, out of the data set and send it to another machine that will try to reproduce the problem by going to the particular URL and performing the same specified user actions.

The automatic categorization system and method may apply, for example, any portion of the collected data set information or all of the information, in an attempt to reproduce the incident which occurred on the computer-based system. In order to check for problem reproducibility, a plurality of computer-based machines in different configurations may be connected to the server performing the characterization. By attempting to reproduce the problem across these different configured computer-based systems, the problem can be characterized by which machines it was reproduced on. For example, the categorization system may use the information in the data set as a template for emulating the environment and situation in the computer-based system when the incident occurred. As an example, the automatic categorization system may use the same sized hard disk drive as the computer-based system. The automatic categorization system may also use various permutations of the computer-based system's hardware or software configuration, based on the data set, to determine which configuration factors, such as different video drivers or different sized hard disk drives, were factors in causing the incident to occur. For example, the automatic categorization system may be able to reproduce a crash using the same video driver as the computer-based system, but may not be able to reproduce the crash when using a different driver indicating that the crash is at least partially caused by the particular video driver. This may be used, for example, in a single computer-based system which contains the automatic categorization system to identify the source of a software crash. The details of the automatic characterization system and method will be described in more detail below with reference to FIG. 4. Once these two steps have been completed the method may loop back to step 172 in which the next incoming data set is received and analyzed. Now, the automatic classification system and method in accordance with the invention will be described in more detail.

FIG. 3 is a flowchart illustrating a method 180 for automatically classifying an incoming data set in accordance with the invention. Prior to describing the steps of the method, an overview of the method will be provided. In the system shown in FIG. 1, the computer-based systems 34 recognize certain incidents, including software crashes, hardware crashes or errors, that happen on the computer systems. When an incident happens on one of the computer-based systems, such as a crash or software bug, the machine state of the particular computer-based system is sent to the server 32 as a data set. In other embodiments of the invention, the system may be connected to a single computer-based system or any other source of a data set. When a plurality of computer-based systems are being monitored as shown in FIG. 1, the server 32 may be continually receiving hundreds or thousands of these data sets and the server may be getting many different machine state snapshots from many different machines. In accordance with the invention, it is desirable for the users of the server, such as a software developer, to be able to know how many "root" (unique) problems/bugs/errors that have occurred. In other words, users of the server would like to know how many of these machine state snapshots are the result of different conditions.

In addition, since some problems show up very frequently, there is little value in the server storing the data set information related to that frequently occurring problem due to the large amount of data space that would be necessary to store the data. The system in accordance with the invention allows a server to automatically classify and characterize a particular problem and once that problem has shown up a predetermined number of times, the server may stop storing all the details of the data set information about it. Rather, the server may just count the number of occurrences of the particular problem in a counter and then dispose of the duplicate data. This frequency counter is useful for determining the importance of a particular problem. This technique allows the development team to focus on the most important problems (i.e., the most frequently occurring problems) at any given time.

In some cases where data sets have been received from different machines, the difficult thing in recognizing similar incidents based upon the data set information is that the data set machine state information is being sent to the server from a plurality of different machines and the state information about the incidents may be highly dependent upon the machine from which it came. For example, the server will receive program counter (PC) addresses, stack crawls, and library addresses, but these pieces of data will be unique for each instantation of the application on each type of machine. Thus, to determine similarity of the incidents and the data, the server must first map this data set information to a machine independent representation which may preferably be the source file function name or variable name level. Once it has mapped the data set information back to a machine independent representation, the server can look at the machine independent state to make determinations about the similarity of the data. For example, bugs that occurred in the same source file on the same source line number with the same (source) call chain and the same values are passed in almost certainly represent the same root problem. By contrast, state machine snapshots that occurred at different places in the same source code are probably different bugs. There is also additional information within the data set which is neither definitely the same bug or definitely not the same bug and these pieces of data fall into a gray area. Thus, the system may, for these gray area items, generate a confidence value of whether it indicates the same bug or a different bug and then the users of the system may set a threshold value so that the system may determine whether or not a particular data set information for a bug is the same or unique. Thus, the system provides a way to automatically look at the bugs and the information about the bugs and group them by similarity.

As described above, the automatic classification may classify an incident represented by a data set based on any combination of the information in the data set. For example, a hardware failure in the computer-based system may generate a set of voltage levels for pins on an integrated circuit that are stored in the data set and may be used to classify the hardware failure. For a software incident, various state information may be used. For example, to classify a deadlock situation, a total up time value, a recent load value and a number of unique network connections value may be used. An example of a classification using a stack crawl will be described below.

In addition in accordance with the invention, the system may create several keys (i.e., multiple analyses) based on different information to either 1) determine a most effective classification; and/or 2) combine the results of the analyses to generate a confidence value. For example, the system may create several keys from a stack chain going to different call depths and then run reports on bugs based on the different stack depths. As described above, if the information as you go deeper in the call chain matches, it is more likely that the data set information is about the same problem and is not unique. Now, an example of the method 180 in accordance with the invention will be described in more detail.

For this description, it is assumed the classification system is located on a server separate from the computer based system although the invention is not limited to this embodiment. In step 182, the computer based system encounters an incident, such as a software crash, captures the data set and sends the machine state data relevant to the incident to the server. Next, in step 186, the server receives the state data including a stack dump, a process list, etc. from the client nub. Next, in step 187, the server, using this data set and symbolic information output from the software build, derives source level information about the data set data including the problem location, the variable values, and the method parameters. Next, in step 188, the server derives keys from the source level information contained in the data set. The server may generate keys based upon the source level information to determine various information about the machine state upon an incident, such as a crash.

In step 189, the data set may be analyzed to classify the data set. In this example, one or more hash keys may be generated. In particular, a deriver may build new keys by hashing the values in the data sets as described in the co-pending application referred above. For example, a key which contains the hash of the names of the source routines on the stack may be added to the data set. Next, in step 190, the server may compare the source level keys generated in step 188 for the particular data set information with the keys from previous incidence reports or root problems that have occurred. The server may then calculate a confidence value or a score which indicates how similar this data set is to a previous incident report from a different data set. As described above, the server may perform several classification analyses, generate results for each analysis and generate a confidence value for the classification. Thus, for each incoming data set information, the server may generate a confidence value which indicates how close this particular data set information is to each other previous incident already stored in the server. For any new classification, the classification system may automatically notify someone of the new classification. For example, the automatic classification system may automatically notify a conventional bug tracking or call tracking system, may send a page to a particular pager or send an electronic mail message to a user of the system.

In step 192, if there is a 100% match between the incoming data set information and a particular incident previously stored in the server, the server may optionally discard this data set about the incident and increment an incident counter. In a preferred embodiment, the server may gather a predetermined number of the data set information about a particular incident, up to a threshold value, and then discard all future data set information about that incident and increment the incident counter. Thus, in accordance with the invention, the server may gather sufficient information to diagnose and solve the particular incident, but does not overload the database with extraneous or duplicative records.

In step 194, the server may generate a visual display for the user of the server indicating the distribution of the different incidents so that the incidents may be assigned to various engineers in the company. Thus, using this method in accordance with the invention, the server may automatically classify incoming data set information into one of a plurality of different incidents so that the user of the system may simply look at the resulting distribution of the different incidents and take appropriate action. Thus, the system may eliminate duplicate records which would otherwise take up additional space on the server and not provide any additional information about the particular incident. An example of this matching process will be described below with reference to FIG. 5. Now, the automatic characterization system and method in accordance with the invention will be described.

FIG. 4 is a flowchart illustrating a method 200 for automatically characterizing an incoming data set at the server. Prior to describing the actual steps of the method, the overall method will be described. As set forth above, the system may automatically characterize an incoming data set based on any or all of the information in the data set. In particular, the system may look at any or all of the machine state and application state data in the data set and try to reproduce the incident (i.e., the hardware or software crash) on a local machine automatically. In other words, the system may use the information in the data set as a template to emulate the entire machine configuration and machine state of the machine at the time of the incident. For example, in the case of a web browser, a crash is often uniform resource locator (URL) dependent. Thus, when a bug comes into the server, the system may take the application specific data, such as the last user actions and the URL that the application was displaying, out of the data set and send it to another machine that will try to reproduce the problem. In the example described, the server would instruct another version of the web browser to go to the particular URL and perform the specified user actions to determine if the problem is reproducible. If the web browser does crash, then the bug may be categorized or characterized as reproducible and stored in the database. This characterization of the data set information helps the user of the server, such as a software developer, to determine which bugs may be caused by an error in the software application as opposed to bugs which may simply be caused by some different problem associated with the particular user's configuration and not the actual software application. For example, a software application may crash because the user's configuration does not have an appropriate driver as opposed to crashing because the software application itself has an error. This system attempts to categorize that data set information about each of those problems into separate categories so it is more clear to the user of the server how to deal with the problem. For example, a reproducible crash may need to be sent to a software engineer to correct the problem while a non-reproducible error may require a quality assurance person to further investigate the problem. As another example, the categorization system may determine, based on the data set, the version of the hardware drivers in use when the machine crashed so that the reproduction attempt uses the same versions of the hardware drivers.

In addition, the system in accordance with the invention, may also look at the machine state information contained in the data set that comes from a particular version of a software application and further build categorization or characterization filters. These categorization filters permit the system to automatically characterize the problem in a rapid fashion. For example, the test machine at the server may crash at the same source code location as the machine associated with the data set, but only some of the variables, such as the system globals or state variables, have the same value. Thus, the server may determine that the variables which are different in the two instances can be removed as a requirement for the characterization of that bug so that the server will automatically recognize that certain variables do not have to be identical in order to identify a bug. Thus, this filter for that bug may be used in the classification method and system described above in order to classify incoming data set information as a new unique or root problem or an existing problem and simply increment an incident counter. Thus, the characterization system and method is an automated iterative process which allows the server to automatically and dynamically build up the filters for determining bug uniqueness which may be used by the classification system.

Today, when software developers try to determine what caused a particular problem one of the first things they do is try to understand the characteristics of the situations in which the problem manifests itself. For example, is the problem related to a specific video driver or peripheral? Is the problem related to other configuration settings, such as the size of the cache or space available on the hard disk? Today, determining these answers is a manual process that can consume a large amount of time on the part of the engineer or the QA person designated to solve a particular problem. With the automated characterization system discussed here, this process is performed by the server automatically, and the correlated results are made available to the engineer or QA person. This can help drastically shorten the amount of time spent to solve a problem.

The categorizing system may thus automatically try various permutations of a crashing machine's configuration to help determine which configuration settings (i.e., different sized hard disk drives or different hardware drivers) are factors which precipitated the crash. As described above, this may occur by using a plurality of machines which each have a different configuration so that each configuration permutation may be tested quickly. Thus, if the bug is reproducible using the same video driver as the crashing machine, but cannot be reproduced without the particular driver, the system could determine that the video driver is a part of the crash which helps isolate the cause of the crash. Now, the actual steps of the method in accordance with the invention will be described with reference to a categorization system on a server separate from the computer-based system as shown in FIG. 1 although the categorization system may be used on a variety of different systems.

The method 200 for automatic characterization of a bug starts at step 202 in which the computer-based system encounters an incident, such as a crash, captures various machine state information, and sends various data in the form of a data set relevant to the incident to the server. In step 204, as described above with respect to the classification method, the server receives the state data from the data set, including the stack dump the process lists, etc. Next, in step 206, the server may determine whether the problem is reproducible by looking for one of the plurality of testing machines, as described above, connected to the server which has a similar configuration to the crashing machine and playing back the sequence of events contained in the crashing machine's data set on the testing machine. In particular, as described above, the system may take the various application and machine specific information from the data set, such as the last user actions and a particular resource being accessed, and then determine whether the bug may be reproduced by a system connected to the server. For example, for a web browser, the application and machine specific information may be the URL which was being accessed as well as the various user actions prior to the crash. Then, the system attached to the server may access the same URL and perform the same user actions to determine whether or not the problem is reproducible. If the bug is reproducible, the engineer at the software developer has what is necessary to determine the problem. If the bug is not reproducible, the system may notify a Quality Assurance engineer to look at the problem and see if they can find a reproducible case so that the engineer can track down the bug. As described above, the system may also try different configuration permutations to determine which configuration choices are factors in causing the bug.

In step 208, if the bug is not reproducible, it is marked as non-reproducible by the server and then in step 210, it is stored in the database. As described above, the system may notify a Quality Assurance engineer to look at the non-reproducible problem and see if they can find a reproducible case so that the engineer can track down the bug. On the other hand, if the problem is reproducible on the system attached to the server, then in step 212 the bug is marked reproducible. An example of a reproducible bug is a bug which is caused by an error within the software application which is machine independent. In step 214, the server maps the machine state output from the data set information from a previously reproducible bug to the source level information and generates keys for the original bug just located and the reproducible bug. Next, in step 215, the server may determine which keys are the same and mark the similar keys as the keys that characterize this problem. Thus, the characterization filter or categorization filter as described above may be created. Thus, the system may be able to consider two bugs to be identical despite the fact that some of the values are different and the system is able to develop some intelligence about how to determine which bugs are the same.

Next, in steps 217 and 218, the server determines whether or not the reproducible bug is located in the server database. If it is not in the database, then the reproducible bug is added to the database and the database is updated. On the other hand, in step 222, if the reproducible bug is already in the database of the server, an incident counter may be incremented. In a preferred embodiment, data set data about a particular reproducible bug may be gathered until a threshold number of pieces of information have been gathered and then for any more data sets, an incident counter may be incremented and the data set is discarded. Thus, in accordance with the invention, the characterization system and method may attempt to reproduce bugs located by data set information as well as generate categorization or characterization filters which help the system to intelligently determine which bugs are actually similar during classification as described above. Now, an example of the results of the classification system will be described.

FIG. 5 is a chart illustrating an example of an incident report 230 generated by the characterization system in accordance with the invention. As shown, the incidents are broken down based on function names, such as memcopy or openfile. The process of taking a parameter and generating a unique key is called hashing. Therefore, in this example, we are selecting to hash the data set data based on function names (i.e., the hashing function uses the routine name on the call stack all the way down to the main ( ) routine in this example). Thus, the software being characterized in this example may have a memcopy routine, an openfile routine, a printfile routine, a page constructor and an inter network routine. The chart thus shows the most commonly occurring incidents. All other incidents which have a value for this particular hash key but are not common (e.g., do not occur sufficiently often) are grouped together and classified as "other". Any incidents which do not have a value for this particular hash key at all (e.g., an incident which was generated due to a power outage so a source routine name could not be determined) are grouped in the "unknown failure" category.

In accordance with the invention, other hashing functions may be used. For example, the call stack hashing function may use the routine name on the top of the call stack only, in which case, all of the memcopy incidents are viewed as one group. The hashing function may also be more specific to include routine parameter values or local variables, such that, in this example, the memcopy incidents may break down into a plurality of different, separate bars on the chart because one bar may represent an incident to a memcopy call in which a variable srcPtr is nil. In addition, other techniques for analyzing the information in the data set may also be used.

The chart of FIG. 5 shows various incidents reported by a plurality of data sets from different computer platforms, broken down by a unique stack crawl hash key, such as the routine name. From the chart, we note that the most common problem is related to the function "memcopy." In this example, memcopy appears twice on the list with different key values for the stack crawl hash key (i.e., the number in parenthesis after the routine name) because the root of the problem is in the parameters that are being passed to memcopy, and we have to look up the call chain to see what functions passed the bad parameters. For each key value, different parameters or parameters with different values are passed to the routine. This chart clearly shows that there are two paths by which bad parameters are making it to memcopy routine.

The next step a developer would often perform is to look at the list of individual incidents that comprise one of these bars. This can be done by clicking on the bar or by performing a new search on the database listing only those incidents that have the target key value. Since the developer can see what the most common problems that the users run into, he can focus his development efforts to improve the user experience as fast as possible by correcting the most common problems.

An example of the list of incidents for the memcopy routine having a hash key value of 7322966031 is:

| | memcopy (7322966031) 11 Incidents | |
|---|---|---|
| ID | Platform | Function containing crash |
| 2585 | Windows NT | Memcopy (0x00016148) |
| 2491 | Windows '95 | Memcopy (0x00016148) |
| 2450 | Mac OS 7.5 | Memcopy (0x00016034) |
| 2397 | Solaris 4.1 | Memcopy (0x00016120) |
| 2201 | Mac OS 7.5 | Memcopy (0x00016034) |
| 2117 | Mac OS 7.5 | Memcopy (0x00016034) |
| 2116 | Windows NT | Memcopy (0x00016148) |
| 2054 | Mac OS 8.0 | Memcopy (0x00016034) |
| 2022 | Solaris 4.0 | Memcopy (0x00016120) |
| 2017 | Windows '95 | Memcopy (0x00016148) |
| 1966 | Windows '95 | Memcopy (0x00016148) |

In this incident report, the ID field is a unique identifier that can be used to uniquely identify and reference each incident. The platform field has information about the operating system on which the incident occurred. In this example, due to the information in the platform field, it is noted that this particular problem is not platform specific. "Memcopy" is the name of the function in which the incident occurred. The number after Memcopy is the offset into the code segment where the incident occurred. Note that the offsets may be different for different platforms, but the stack key recognizes them as being the same incident.

As will be obvious to someone versed in the art, the actual function name (which requires symbol table information) is not necessary to use this technique. Rather than the function name, the system can use the code module and offset within the module to uniquely identify the stack chain. Note, however, that on many systems the absolute value of the stack parameters are not unique and would not go far enough to provide useful information for this type of classification because the operating system may load the modules in different address ranges, and the absolute program counter addresses are dependent on where the system loaded the module and on the system configuration. Thus, this invention uses module identifiers and relative offsets within the code module to determine call chain similarity.

In a preferred embodiment, this display allows you to drill down further into the data and see all the information related to a specific incident. This would show us the entire stack call chain, the value of parameters passed into each function and the values of local variables. By looking at these incidents as a set, the developer can learn a lot about what the potential problem might be. For example, it is clear that the problem is not related to the platform since the identical failure happens on several platforms.

Below, an example of an individual incident report is shown which includes a correlative view of various parameters. This view very quickly shows which parts of the incident are common across this set of data and which are unique to this particular incident (and probably not significant as related to the cause of this particular problem.) The percentage numbers are the percentage of the other incidents, ten in this example, which have the same value for that field.

| | |
|---|---|
| Incident #2585 | 12/16/97 |
| Application Gold for Windows v5.01 Beta | (100%) |
| User Comments: | |
| "Whenever I try to print the application crashes" | |
| Incident Reason: Access Violation | (100%) |
| System Info: | |
|     Windows NT 4.0 build 1381 Service Pack 3 | (10%) |
|     PentiumII 300 MHz | (0%) |
|     65535 K Physical Ram | (0%) |
| Where: | |
|     Memcopy [Stdlib.c, line 244] | (100%) |
|         srcPtr = 0xdeadbeef, | (100%) |
|         dstPtr = 0x002ab7d0, | (10%) |
|         size = 0xcdcdcdcd) | (100%) |
|         loopCounter = 0 | (100%) |
|     PrintScreen (objectPtr = 0xdeadbeef) | (100%) |
|     [PrintUtils.c, line 42] | |
|         pageCounter = 3 | (20%) |
|         textMode = 1 | (50%) |
|         margin = 72 | (30%) |

From this information, a developer can quickly understand what the problem is. As before, it's clear that the problem is not specific to the platform (only a 10% correlation in this data set), or that it is related to the processor speed (no other incident was a 300 MHz Pentium II), or to the amount of system RAM. On the other hand, all ten of the other incidents had the same value for the srcPtr and the same size arguments for the Memcopy function. The dstPtr showed only a 10% correlation, so this problem is likely not related to the value in that parameter. All incidents also had the loop counter local variable set to 0, so that might be a clue as well.

Taking a look at the next function up the stack chain, PrintScreen, it is evident that every incident had an objectPtr equal to 0xdeadbeef passed to it. This is likely a sign that a chunk of uninitialized memory is being passed into the PrintScreen function. The local variables in the PrintScreen function do not seem to be particularly relevant to this problem due to the low correlation values.

These correlation values are what you would expect since we started with a classification where the stack crawl function names (i.e., MEMCOPY) were the same. We could further restrict the original classification to a set where the function names are the same but also the value of the "margin" local variable in the PrintScreen function matched. Rather than turn up the original 11 incidents as above, we would now see four incidents (this one and three others). We might see the other seven incidents together in one group or in many groups, depending on the value of the "margin" variable in those incidents.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A system for processing a data set retrieved from a computer-based system, each data set indicating the state of the computer-based system when a predetermined incident occurs within the computer-based system, the system comprising:

means for receiving the incident state data from the computer-based system;

means for processing the incident state data to derive one or more keys that characterizes this incident;

means for comparing the generated keys to other previously generated incident reports to classify the incident report, based on the data contained in the incident report; and means for generating a report to indicate similar incident reports.

2. The system of claim 1, wherein the processing means further comprises means for hashing the incident state data to derive the keys.

3. The system of claim 1, wherein said processing means comprises means for deriving a key based on the values in a stack call chain.

4. The system of claim 1, wherein said processing means comprises means for deriving a key based on an event history.

5. The system of claim 1, wherein said report generating means comprises means for grouping incident reports based on the function name of the function in which the predetermined incident occurred.

6. The system of claim 1 further comprising means for automatically eliminating a duplicate incident report and means for incrementing a counter for the duplicate incident report that is eliminated.

7. The system of claim 1 further comprising means for notifying a predetermined system a first time an incident with a particular classification occurs.

8. The system of claim 7, wherein said predetermined system comprises one of a bug tracking system and a call tracking system.

9. The system of claim 7, wherein said predetermined system comprises a pager.

10. The system of claim 7, wherein said predetermined system comprises an electronic mail box of a user.

11. The system of claim 1, wherein said predetermined incident comprises a bug in software being executed by the computer-based system.

12. The system of claim 1, wherein the computer-based system further comprise a plurality of different computer platforms using different operating systems executing the similar software applications.

13. A method for processing a data set retrieved from a computer-based system, each data set indicating the state of the computer-based system when a predetermined incident occurs within the computer-based system, the method comprising:

receiving the incident state data from the computer-based system;

processing the incident state data to derive one or more keys that characterizes this incident;

comparing the generated keys to other previously generated incident reports to classify the incident report, based on the data contained in the incident report; and generating a report to indicate similar incident reports, wherein the report further comprises grouping incident reports based on the function name of the function in which the predetermined incident occurred.

14. The method of claim 13, wherein the processing further comprises hashing the incident state data to derive the key.

15. The method of claim 13, wherein said processing further comprises deriving a key based on values in a stack call chain.

16. The method of claim 13, wherein said processing comprises deriving a key based on an event history.

17. The method of claim 13 further comprising automatically eliminating a duplicate incident report and incrementing a counter for the duplicate incident report that is eliminated.

18. The method of claim 13 further comprising notifying a predetermined system a first time an incident with a particular classification occurs.

19. The method of claim 18, wherein said predetermined system comprises one of a bug tracking system and a call tracking system.

20. The method of claim 18, wherein said predetermined system comprises a pager.

21. The method of claim 18, wherein said predetermined system comprises an electronic mail box of a user.

22. The method of claim 13, wherein said predetermined incident comprises a bug in software being executed by the computer-based system.

23. The method of claim 13, wherein the computer-based system further comprise a plurality of different computer platforms using different operating systems executing the similar software applications.

24. A system for processing a data set retrieved from a computer-based system, each data set indicating the state of the computer-based system when a predetermined incident occurs within the computer-based system, the system comprising:
means for receiving the incident state data from the computer-based system;
means for processing the incident state data to derive one or more keys that characterizes this incident;
means for identifying characteristics which uniquely identify an incident report associated with a particular predetermined incident;
means for automatically simulating the predetermined incident using the identified characteristics;
means for identifying an incident report as reproducible if the predetermined incident is reproduced using the identified characteristics;
means for generating a plurality of characteristic subsets, said characteristic subset comprising one or more of the identifying characteristics in said set of characteristics, means for automatically simulating the predetermined incident using each of the characteristic subsets to generate a simulation result for each characteristic subset, and means for determining particular characteristics which caused the predetermined incident based on the simulation results; and
wherein said means for automatically simulating the predetermined incident using each of the characteristic subsets comprises a plurality of computer-based systems, each computer-based system being configured so that the computer-based system exhibits the characteristics from the characteristic subset.

25. A system for processing a data set retrieved from a computer-based system, each data set indicating the state of the computer-based system when a predetermined incident occurs within the computer-based system, the system comprising:
means for receiving the incident state data from the computer-based system;
means for processing the incident state data to derive one or more keys that characterizes this incident;
means for identifying a set of characteristics which uniquely identify an incident report associated with a particular predetermined incident, means for automatically simulating the predetermined incident using the identified characteristics, and means for identifying an incident report as reproducible if the predetermined incident is reproduced using the identified characteristics;
means for generating a plurality of characteristic subsets, said characteristic subset comprising one or more of the identifying characteristics in said set of characteristics, means for automatically simulating the predetermined incident using each of the characteristic subsets to generate a simulation result for each characteristic subset, and means for determining particular characteristics which caused the predetermined incident based on the simulation results; and
wherein said means for automatically simulating the predetermined incident using each of the characteristic subsets comprises a plurality of computer-based systems, each computer-based system being configured so that the computer-based system exhibits the characteristics from the characteristic subset.

26. A method for processing a data set retrieved from a computer-based system, each data set indicating the state of the computer-based system when a predetermined incident occurs within the computer-based system, the method comprising:
receiving the incident state data from the computer-based system;
processing the incident state data to derive one or more keys that characterizes this incident;
identifying a set of characteristics which uniquely identify an incident report associated with a particular predetermined incident, automatically simulating the predetermined incident using the identified characteristics, and identifying an incident report as reproducible if the predetermined incident is reproduced using the identified characteristics;
generating a plurality of characteristic subsets, said characteristic subset comprising one or more of the identifying characteristics in said set of characteristics, automatically simulating the predetermined incident using each of the characteristic subsets to generate a simulation result for each characteristic subset, and determining particular characteristics which caused the predetermined incident based on the simulation results; and
wherein said automatically simulating the predetermined incident using each of the characteristic subsets comprises using a plurality of computer-based systems, each computer-based system being configured so that the computer-based system exhibits the characteristics from the characteristic subset.

* * * * *